United States Patent [19]
Noky

[11] Patent Number: 5,433,904
[45] Date of Patent: Jul. 18, 1995

[54] PROCESS FOR SEALING DUCTS OF A MONOLITHIC HONEYCOMB BODY

[75] Inventor: Werner Noky, Mainz-Gonsenheim, Germany

[73] Assignee: Schott Glaswerke, Mainz, Germany

[21] Appl. No.: 151,674

[22] Filed: Nov. 12, 1993

[30] Foreign Application Priority Data

Nov. 12, 1992 [DE] Germany ............ 42 38 120.7

[51] Int. Cl.6 ............................................. C04B 33/32
[52] U.S. Cl. .................................. 264/40.1; 264/59
[58] Field of Search ................ 264/40.1, 40.2, 59, 264/259, 267

[56] References Cited

U.S. PATENT DOCUMENTS

| 4,293,357 | 10/1981 | Higuchi et al. ............ 156/89 |
| 4,329,162 | 5/1982 | Pitcher, Jr. ................. 55/523 |
| 4,411,856 | 10/1983 | Montierth ................. 264/267 |
| 4,427,728 | 1/1984 | Belmonte et al. ......... 428/117 |
| 4,432,918 | 2/1984 | Paisley ....................... 264/43 |
| 4,557,773 | 12/1985 | Bonzo ......................... 156/64 |
| 4,557,962 | 12/1985 | Belmonte et al. ......... 428/117 |
| 4,563,414 | 1/1986 | Ogawa et al. ............ 430/325 |
| 4,576,774 | 3/1986 | Hazard et al. ............ 264/267 |
| 4,759,892 | 7/1988 | Bonzo ......................... 264/251 |
| 5,021,204 | 6/1991 | Frost et al. ................. 264/60 |

FOREIGN PATENT DOCUMENTS 0042302 12/1981 European Pat. Off. .
0070202 1/1983 European Pat. Off. .
0564967 10/1993 European Pat. Off. .

Primary Examiner—Christopher A. Fiorilla
Attorney, Agent, or Firm—Millen, White, Zelano & Branigan

[57] ABSTRACT

A process for frontal, alternate sealing of ducts in a ceramic honeycomb monolith includes temporarily sealing some ducts with a first, hardenable viscous composition; permanently sealing the then still vacant duct openings with a second hardenable, viscous composition. The first composition is removed during the course of hardening the second composition. The ceramic honeycomb monolith is for exhaust gas cleaning systems of internal combustion engines.

17 Claims, 2 Drawing Sheets

PROCESS FOR SEALING DUCTS OF A MONOLITHIC HONEYCOMB BODY

Commonly assigned U.S. patent application Ser. No. 08/046,865, filed Apr. 8, 1993, now allowed, and U.S. patent application Ser. No. 08/214,515, filed Mar. 18, 1994, a division of U.S. Appln. Ser. No. 08/046,865.

BACKGROUND OF THE INVENTION

The invention relates to a process for the computer-controlled, frontal, alternating sealing of ducts, extending all the way through in the initial condition, pertaining to a honeycomb monolith that can be ceramed, for exhaust gas cleaning systems of internal combustion engines wherein the openings, vacant later on during operation, which openings conduct the oncoming, unpurified gas and, respectively, the outflowing, purified gas of the ducts, are, with the aid of metering heads of a metering device, first sealed temporarily with a first, hardenable, viscous composition, after the hardening of which the thereafter still vacant duct openings are sealed with a second, likewise hardenable, viscous composition having a permanent effect, and subsequently the first composition is removed during the course of hardening of the second composition.

Such exhaust gas cleaning systems are finding increasing usage, for example, as soot filters in passenger cars, trucks, and especially in city buses driven by means of a diesel engine. However, exhaust gas cleaning has gained rising significance also in stationary facilities, such as, for example, emergency power units.

The effect of such a filter is based on the feature that the ducts of the honeycomb monolith are sealed alternatingly on both sides in such a way that the exhaust gas is forced to flow through the porous walls between the ducts. In this arrangement, the walls act as filters for the soot, which latter occurs in fine particles. However, the ducts are clogged with soot and other deposits after a certain amount of time. Therefore, such a filter must be repeatedly regenerated, i.e. heated to temperatures at which the retained particles can be oxidized.

The blanks for the honeycombs frequently consist of cordierite or also of sintered glass ceramic, produced in most instances by an extrusion process with subsequent drying and sintering. On account of drying and sintering, the body shrinks, and does this often with deformation. This nonuniform shrinkage results in an incalculable deviation of the actual geometry from the desired geometry of an idealized honeycomb body. Furthermore, even the extrusion step alone can lead to a deformation of the honeycomb structure.

These deviations cause considerable problems in the further processing of the honeycomb monolith, for example when the ducts must be mechanically sealed alternatingly on both sides.

A standard monolith has a diameter of about 14.4 cm. The rough honeycomb dimensions are about $3.6 \times 3.6$ mm so that there are about 1,400 honeycomb ducts per end face with a hole cross section of respectively $2.4 \times 2.4$ mm. Consequently, approximately 700 honeycomb openings and thus filter ducts must be sealed alternatingly on each end face. Based on the deviations from the desired geometry displayed by the monolith, it is impossible to seal the 700 openings per end face all at once in one operating step with a nozzle head having 700 nozzles.

A manual sealing of the ducts is not feasible, either, in any way, in view of the thus-incurred high labor cost.

Devices and methods for the alternating sealing of the honeycomb ducts of a monolithic honeycomb body have been suggested in the state of the art.

Attention is invited to U.S. Pat. No. 4,411,856, as one example. This reference proposes the use of a mask completely covering one end face of the monolith, this mask being provided with passages and with peg-like extensions on the side facing the monolith. The pegs are placed into the ducts that are not to be sealed whereas the composition is introduced through the passages in the mask into the end regions of the ducts to be sealed. An attempt is made to take the aforementioned deviation of the monolith from a desired geometry into account by making the mask utilized of an elastic material.

This method may be applicable within limits. There is, though, the problem that the spacing of the above-mentioned pegs to the passages is fixed so that the compensation of the deviations of the monolith from the desired geometry, obtained by the elasticity of the mask, remains restricted to very low values.

EP 0 042 302 B1 discloses a process for the production of a ceramic honeycomb filter from a porous, ceramic honeycomb body with a plurality of ducts which latter extend through the body from one frontal face to the other frontal face, a perforated film being arranged at each frontal face end, the holes of this film corresponding with specific ducts at the frontal face ends; a sealing material is introduced into the ducts through these perforations in the film in order to seal the end zones of these specific ducts, and certain ducts that have not been sealed at the one frontal face end are sealed at the other frontal face end. As a modification of this process, the reference describes that the perforations of the film correspond to those ducts which are not to be sealed so that a heat-volatile material is filled into the ducts which volatilizes during the baking or sintering of the honeycomb, that the films are removed, and that the remaining ducts not filled with the heat-volatile material are sealed with a sealing compound.

Here again, it is very expensive to produce a perforated film, the perforations of which must correspond to the ducts on the frontal face ends. Probably, the film must carry differing perforations for each honeycomb body, even for each frontal face of a single honeycomb body; this precludes an inexpensive, economical manufacturing process.

A procedure is known from the teaching of U.S. Pat. No. 4,329,162 wherein metering heads of a metering device are utilized, with nozzles that are lowered into the ducts to be sealed and introduce sealing compound into the end zone thereof.

However, the reference does not disclose how this is to be done in an economical fashion, with tolerable expense.

A computer can be derived from U.S. Pat. No. 4,557,773 which stores an image of the end face of the monolith, scanned by an image recorder, in a memory and processes this image, and lowers tools into ducts of the scanned end face in correspondence with a fixedly determined operating plan.

Also according to U.S. Pat. No. 4,557,773, it is necessary to cover the end faces with a foil, with great expense of labor.

DE 42 11 787.9, owned by applicant firm, a process is described for the production of a filter in the form of a ceramic honeycomb monolith with a plurality of continuous ducts which latter are sealed alternatingly with a plug at the end faces of the monolith, starting with a blank of the honeycomb monolith of material that can be ceramed, having ducts open on both sides. In this process, zones of ducts are determined on both sides corresponding, within predeterminable tolerances, to the desired geometry of an idealized honeycomb monolith, with the proviso that the zones contain a maximally high number of ducts; metering heads of a metering device having varying numbers of nozzles, which latter are lowered into the ducts to be sealed and introduce the viscous plugging composition into the end zone thereof, are driven and activated by a motor in such a way that, in correspondence with the aforementioned determination of the duct zones, the metering head having the highest number of nozzles is utilized with greatest frequency, and thereafter the metering head having the next-lower number of nozzles is employed, until all provided ducts have been sealed and the thus-prepared honeycomb monolith is subsequently subjected to a ceraming process.

In this method, the sealing compound is introduced into the honeycomb ducts directly by means of the single or multiple nozzle heads after the honeycomb geometry has been ascertained. The nozzles utilized must here correspond approximately to the diameter of the honeycomb ducts in order to fill the duct completely; however, this makes positioning considerably difficult.

Furthermore, the metering device must be adapted exactly to the rheological, chemical, and physical properties of the respective sealing compounds which are often rheologically different.

All of the parts of the facility must be composed of expensive, corrosion-proof materials in order to avoid corrosion and decomposition processes as a consequence of the chemical aggressiveness of the sealing compound.

Moreover, the materials must also be resistant to abrasion inasmuch as the sealing compound frequently contains relatively coarse-grained and, in part, very hard and splintery components.

During each change of the sealing compound or when the facility is shut down, it is necessary to clean the entire system at great expense. This means that the system must first be emptied of all material, causing additional loss of material and production of waste. Subsequently, the entire facility, in the most favorable case, must be washed out by several intermediate flushing steps or, in case of hardened residues, must even be disassembled and cleaned by hand.

In order to obtain homogeneity of the composition, it is furthermore necessary to practice constant agitation, mixing, and recirculation by pumping to avoid settling in the pipelines and unmixing phenomena within the composition.

SUMMARY OF THE INVENTION

It is, therefore, an object of the present invention to provide a computer-controlled and automated process for the production of a filter in the form of a ceramic honeycomb monolith wherein, starting with a blank of the monolith, the ducts can be sealed, with a composition that can be ceramed, at the end faces alternatingly by means of a metering system on a large industrial scale without any problems and in an economical fashion. It is furthermore an object of the invention to technically further develop and substantially simplify the sealing step so that (a) there is no longer any need for masks, templates, foils, films, or similar auxiliary means, (b) substantially smaller nozzle cross sections can be utilized, and (c) the metering device with metering facility, the feed conduits, the metering heads, and nozzles can be operated with one composition that can be processed without any problems, without abrasion, without chemical aggressiveness, and without settling tendency, and (d) the composition that can be ceramed is introduced via another metering facility of a more rugged structure.

This object has been attained by a process wherein initially the first end face (19) is scanned by an image recorder (10), and the thus-scanned image is stored in a memory of a computer and is processed, the computer searches the image for coherent zones (2, 3, 4, 5) of ducts (6) corresponding, with predeterminable tolerances, to the desired geometry of a corresponding zone of an idealized honeycomb monolith, with the proviso that the zones contain a maximally high number of ducts (6), the working scheme of the metering heads (17, 18) of a metering device actuated by the computer is fixedly determined, the nozzles (22, 23) of the respective metering heads (17, 18) are lowered, in correspondence with the fixed working scheme, into the ducts to be sealed, and a first sealing compound which can be burnt out and/or can be removed by melting is introduced into the end regions of the ducts, wherein the metering heads (17, 18) are moved and activated by motor means in such a way that, in correspondence with the aforementioned determination of the zones of ducts (6), the metering head having the highest number of nozzles (22, 23) is utilized with greatest frequency and thereafter the metering head having the next-lower number of nozzles is employed, until all provided ducts (6) have been sealed, thereafter the nozzles (22, 23) are moved out of these ducts, the monolith (1), after sealing the ducts (6) on the first end face (19), is rotated by 180° and, in corresponding fashion, the ducts (6) on the other end face (20) are sealed in a pattern complementary to that on the first end face (19), after hardening of the first sealing compound in the end regions of the ducts (6), a second composition is used which is different from the first and can be ceramed and/or sintered, for sealing the then still open ducts wherein all still open ducts of the end faces (19, 20) are sealed in their end regions with a metering cylinder (28) covering the entire filter surface, in a single working step, and that the thus-prepared honeycomb monolith (1) is subsequently subjected to a heating-up and ceraming process wherein the first sealing compound is burnt out and/or removed by melting.

According to the invention, it is preferred to introduce into the duct openings, as the first composition, a predominantly organic mass with a viscosity $\eta$ of $10^5$ dPa s to $10^6$ dPa s, especially $10^{5.5}$ dPa s to $10^5$ dPa so In this connection, an organic material is utilized as the first composition which can be burnt out and/or removed by melting at temperatures lower as compared with the second composition.

Thermoplastic compositions proved to be especially preferred according to the invention and simple in usage, the viscosity of which can be readily set at any time during processing and which harden rapidly and permanently in contact with the monolith.

The first "mass" introduced into the ducts via the nozzles which latter, in this case, need to have merely a diameter of 1 mm and smaller is understood to mean here primarily also, for example, waxy compounds, such as paraffin, stearin, compositions on silicone basis, or on synthetic resin basis, or based on a hot-melt adhesive.

According to this invention, in place of the expensive metering device for an inhomogeneous ceramic sealing compound consisting, in part, of many components, a simple metering device is utilized for a homogeneous filling compound which can be easily handled and can be burnt out and/or removed by melting. As mentioned above, liquid wax can be used with preference; this wax rapidly solidifies upon contacting the cold monolith.

According to the invention, the second composition can be forced in a single working step into all ducts not sealed by the first composition by way of a metering cylinder covering the entire filter surface, or it can be introduced by means of a so-called doctor blade.

The second composition utilized here is a high-temperature-resistant, predominantly inorganic material which can be ceramed and/or sintered. The inorganic material which is ceramed and/or sintered is preferably a pasty mixture of powdered glass and/or natural raw materials having compositions approximating the stoichiometry of cordierte ($2\ MgO \cdot 2\ Al_2O_3 \cdot 5\ SiO_2$ is equivalent, in weight percent, to about 13.6% MgO, 34.9% $Al_2O_3$ and 51.4% $SiO_2$). Preferably, the pasty compositions are introduced having viscosities $\eta$ of $10^4$ dPa to $10^5$ dPa. Handling this possibly corrosive and abrasive mass is very much less problematic when using a large-area metering cylinder or doctor blade than with the utilization of nozzles having cross sections in the millimeter range. The entire processing technique of the composition and the possibilities of metering same are considerably simplified with the use of large metering cylinders or with utilization of the doctor blade technique.

Thus, according to the invention, it is possible, for example, to use herein substantially more viscous, pasty materials which then do not show any tendency whatever toward unmixing.

After sintering the resulting dense cordierite, glass-ceramic materials are customarily matched with respect to their composition with the chemistry of the monolith. The materials adjust in their shrinkage behavior so that they seal the ducts of the honeycomb monolith tightly and firmly at any time, even after ceraming.

The metering process, for example with wax, is still further considerably facilitated, besides avoiding the aforementioned disadvantages of metering a ceramic filling compound, by the fact that it is possible to work with smaller nozzles, e.g. with nozzle diameters of 1 mm and therebelow.

According to the invention, zones (2, 3, 4, 5) of ducts (6) are determined on both end faces (19, 20) which correspond within predeterminable tolerances to the desired geometry of an idealized honeycomb monolith, with the proviso that the zones contain a maximally high number of ducts (6), that metering heads (17, 18) of a metering device having differing numbers of nozzles lowered into the ducts (6) to be sealed, which nozzles introduce a first sealing compound that can be burnt out and/or removed by melting into the duct end region, are moved and activated by motor means in such a way that, corresponding to the aforementioned determination of the zones of ducts (6), the metering head (2) having the highest number of nozzles (22, 23) is utilized with greatest frequency, and thereafter the metering head (3) having the next-lower number of nozzles is utilized, until all provided ducts (6) have been sealed, that after hardening of the first sealing composition in the end regions of the ducts (6) subsequently a second composition different from the first and capable of being ceramed and/or sintered is utilized for sealing the ducts then still open, and that the thus-prepared honeycomb monolith (1) is thereafter subjected to a heating and ceraming process wherein the first sealing composition is burnt out and/or removed by melting.

In this process, initially the first end face is scanned by an image recorder, for example a television camera, and the scanned image is stored in a memory of a computer and is processed. The computer searches the image for coherent zones of ducts corresponding, within predeterminable tolerances, to the desired geometry of corresponding zones of an idealized honeycomb monolith.

This search for coherent zones takes place with program control. Thereafter, the working scheme of the metering heads activated by the computer is determined. This is done in accordance with the invention pursuant to the proviso that, if at all possible, the metering head having the greatest number of nozzles is used most frequently. Thereby the time for sealing the ducts is optimized, i.e. minimized, in that a maximum number of ducts is always sealed at the same time.

In the residual zones, for example along the rims of the monolith, there will remain zones with only a few ducts left to be sealed. For these, a metering head is then used having a smaller number of nozzles, for example two or four nozzles.

In correspondence with the fixed working scheme, the nozzles of the respective metering heads are lowered into the ducts to be sealed, and the composition is introduced into the end regions of the ducts whereupon the nozzles are again moved out of the ducts.

After the one end face of the monolith has thus been treated and correspondingly all provided ducts have been sealed with the composition, the monolith is turned by 180°. The ducts are sealed on the other end face in an exactly corresponding fashion, but with a pattern complementary to that on the first end face. Only thereby will the monolith become a filter.

Advantageously, the contours of the determined zone of ducts form a rectangle. This procedure corresponds with a perceptual design of the metering heads wherein the nozzles are arranged in a rectangular matrix.

After the now alternating sealing of the ducts with wax or a similar material, there follows the combined sealing of all remaining ducts with a ceramic filler mass, according to the invention in a single working step by way of a metering cylinder covering the entire filter surface, or with a doctor blade.

Then follows a burning out or removal by melting, without residues, of the first composition, for example a wax material, such as paraffin or stearin. This can take place either in a separate tempering step or during the subsequent sintering of the monolith during the ceraming step.

An apparatus for performing the process has been described in detail in P 42 11 787.9. The apparatus must here be merely supplemented by a metering cylinder capable of covering the entire filter surface.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

The honeycomb monolith 1 exhibits a plurality of ducts 6 separated from one another by the duct walls 7. These duct walls 7 are porous and perform, after the alternating sealing of the ducts 6 on both end faces of the monolith 1, the actual filtering function in that particles are retained by the walls 7 whereas the exhaust gases can pass through the walls into the neighboring ducts not sealed on the other end face, from which ducts the exhaust gases can thus be exhausted. The outer wall 8 of the monolith is impermeable to gas.

Figure 1:
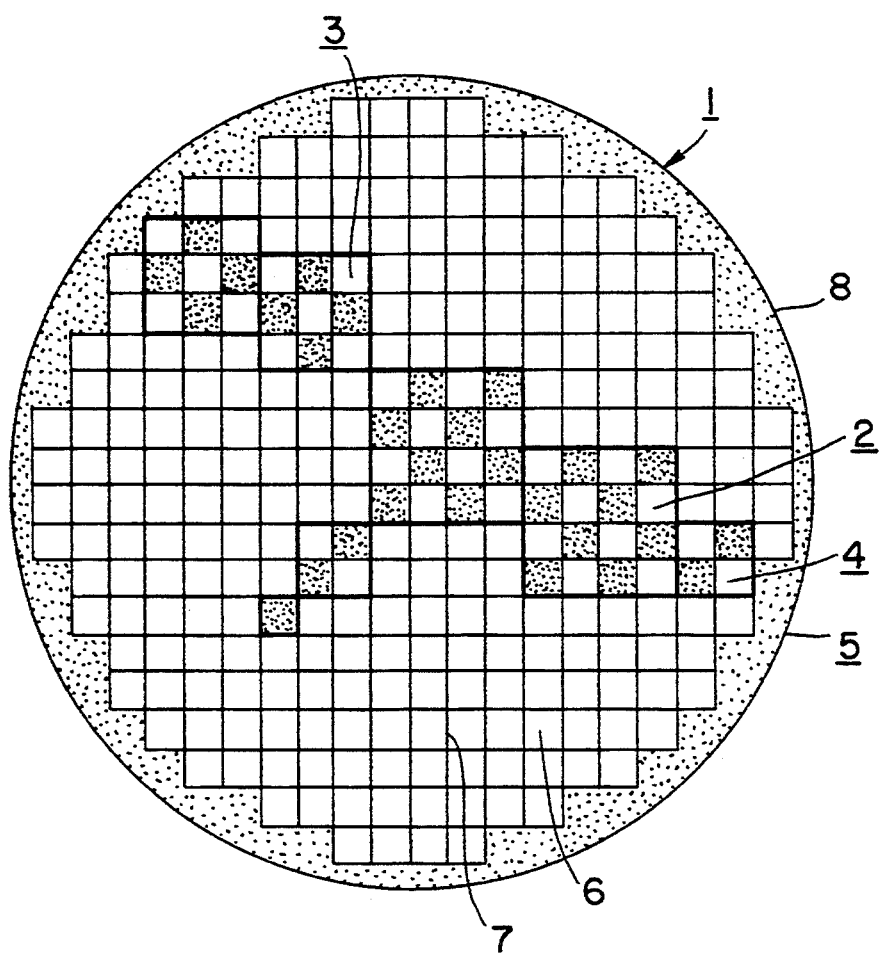
FIG. 1 is a schematic top view of an end face of a honeycomb monolith with schematically illustrated zones of ducts of varying size.

The geometry of the monolith shown in FIG. 1 is idealized. In reality, there occur not inconsiderable deviations from this desired geometry as a consequence of varying shrinkage during drying and sintering of the monolith, as well as due to a possible deformation of the honeycomb structure during extrusion.

FIG. 1 shows schematically zones 2, 3, 4 and 5 which are to represent zones of ducts 6 corresponding, within predeterminable tolerances, to the desired geometry of an idealized honeycomb monolith. In the illustrated embodiment, the zones are of a square configuration. The areas within the zones that have been left white point to those ducts which, during performance of the process, are initially left vacant whereas the blackened areas denote those ducts 6 which are to be sealed first. The blackened areas are then likewise the locations where an associated metering head is applied, this metering head having nozzles by means of which the first composition is injected into the respective ducts.

Thus, according to FIG. 1, the zone 2 extends over 16 ducts, in total, of which 8 are to be sealed first of all. The corresponding ratio in zone 3 is 9 to 4, in zone 4 then 4 to 2. Zone 5 represents merely a single duct 6. In this case, the respective duct must be sealed by a metering head having only one nozzle since the geometrical deviations are so large that no other metering head with several nozzles can be utilized any more.

According to the process of this invention, one end face of the monolith 1 is scanned, and the image information is stored in a memory of a computer and processed.

Then, the centers of the ducts are determined with program control. The software of the computer then places the rasters of zones 2–5 over the stored image information, the attempt being made along the lines of optimizing to utilize the largest zone 2 as frequently as possible. Once this can no longer be done, smaller zones are placed over the image information in the computer memory until finally all ducts have been subdivided into zoned areas. The computer then calculates therefrom a working choice which determines the metering heads toward which the monolith 1 is to be moved, and the sequence of this operation. Beginning with the largest zone 2, the monolith 1 is thus advanced, for example, first of all to the metering head having the largest number of nozzles arranged in the same pattern as the zone 2. In case several more zones of this size have been determined, the monolith is moved correspondingly and made to approach once again, or repeatedly at varying locations, the largest metering head. Thereafter, for example, the next-smaller zones 3 of the monolith that have been determined are moved to the next smaller metering head until finally all those ducts 5 remain which require a separate treatment by a metering head having only one nozzle.

After this process has been performed, the ducts 6 of the monolith 1 are sealed on one of its end faces. The monolith is thereafter turned by 180° and the process is carried out correspondingly, but maintaining a complementary sealing pattern for the ducts. After the controlled sealing of the ducts 6 on both end faces of the monolith 1, the latter is placed underneath a metering cylinder 28 filled with a ceramic material, preferably the diameter of this cylinder corresponding approximately to the entire filter surface. The metering cylinder 28 is connected via the conduit 29 to a metering facility 30 and is fed, likewise with computer control, with the ceramic composition present in the metering facility 30. By way of this cylinder, a specific quantity of the ceramic mass is forced into the small ducts, presently not as yet sealed with the first composition, down to a certain desired depth. Subsequently, the monolith is again rotated by 180° and, with the aid of the metering cylinder 28 covering the entire filter surface, all ducts are filled also on the opposite end face of the monolith.

After the thus-controlled sealing of the ducts 6 with a first composition on both end faces of the monolith and the subsequent sealing of all ducts, then still vacant, with the second, ceramic composition, the monolith is subjected to a temperature schedule. At temperatures far below the ceraming temperature the organic, first composition will be burnt out or removed by melting, and thus will again leave vacant ducts while, with additional heat to the ceraming temperature the second composition will be ceramed together with the monolith. The finished filter then constitutes the culmination of this process. The proposed process leads to a technically substantially simplified sealing operation for the ducts of a honeycomb monolith.

Figure 2:
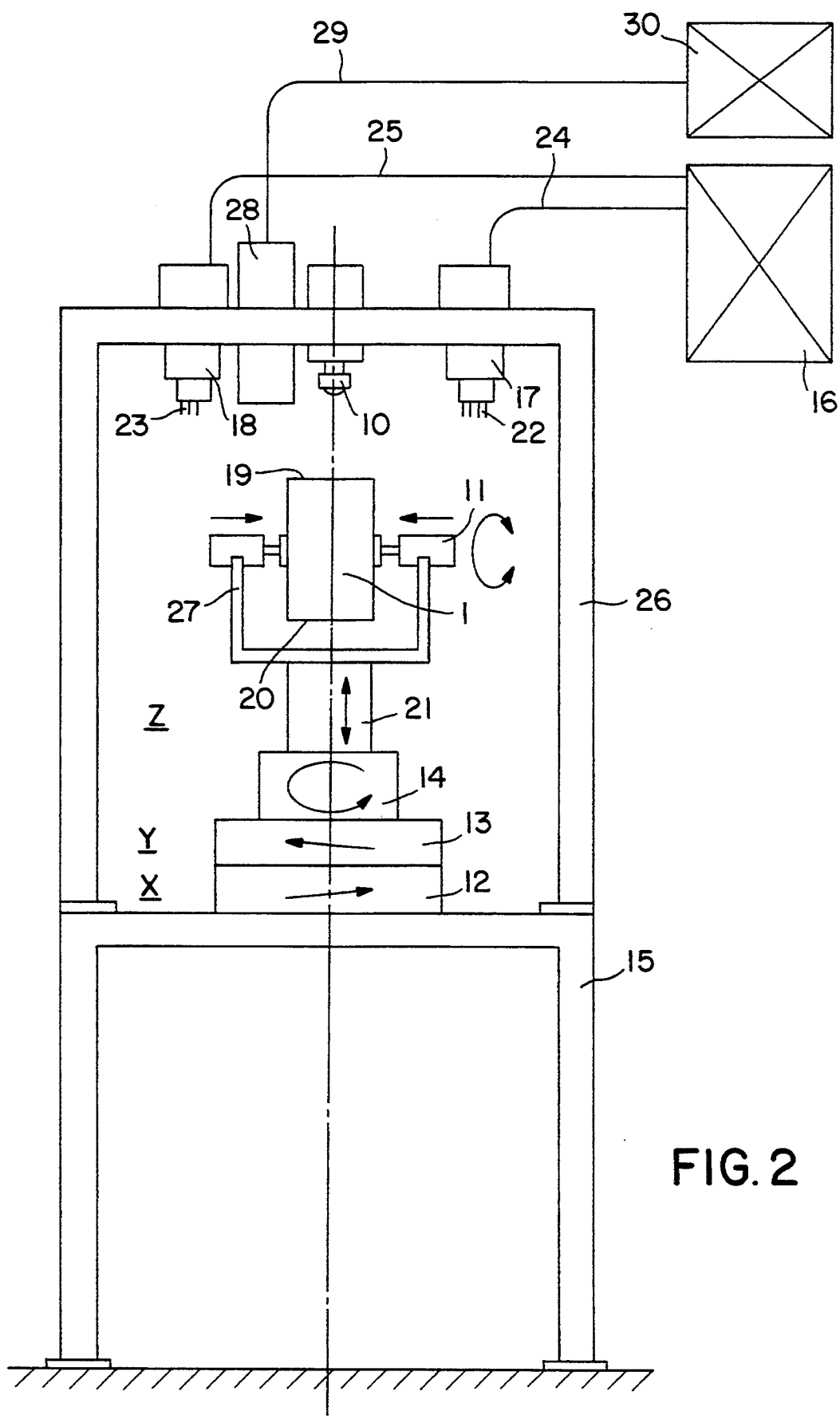
FIG. 2 is an illustration of the apparatus according to this invention, in principle.

An apparatus for performing the process is illustrated schematically in FIG. 2.

A base frame 15 carries a motor-driven slide unit 12, 13, 21, between which a swiveling device 14 is additionally inserted. The slide unit permits movement in all three dimensional axes of a bracket 27 carried by the slide unit, a clamping and turning device 11 being mounted to this bracket. This clamping and turning device 11 clamps between its jaws a honeycomb monolith 1, the two end faces 19 and 20 of which are to be worked on in the way described hereinabove. The slide unit 12, 13 and 21, as well as the swiveling device 14 and the clamping and turning device 11 are actuated by a computer, not shown, in conformance with the working route determined by the computer. The base stand 15 moreover supports a frame 26 extending over the slide unit as well as the clamping and turning device.

Above the monolith 1, a camera 10 as the image recorder is fixedly countersunk into the frame 26. The main axis of the camera 10 is aligned in coincidence with the main axis of the monolith 1. Moreover, FIG. 2 shows two metering heads 17 and 18, likewise fixedly countersunk into the frame 26. They are connected via conduits 24 and 25 with a metering facility 16 and are fed, under computer control, with the composition contained in the metering facility 16.

The metering heads 17 and 18, the conduits 24 and 25 and the metering facility 16 can be heated for processing thermoplastic compositions.

These metering heads exhibit varying numbers of nozzles 22 and 23. The metering heads 22 and 23 are operated by the slide unit in correspondence with the result of the image processing, and the monolith 1 is moved by the component 21 toward the respective metering head which then injects, for example, the thermoplastic composition into the thus-determined ducts 6 in the monolith 1.

Moreover, FIG. 2 also illustrates a metering device 28 likewise fixedly mounted within the frame 26. This device contains the ceramic filling composition. After the first, organic material, for example wax, has solidified in the ducts 6, the ceramic filler composition is forced, by way of this metering device covering the entire filter surface, onto the surface of the monolith 1 and thus is pressed into the still open ducts down to a desired depth.

The thus-prepared monolith is thereafter subjected to a tempering and ceraming operation during which the first composition is burnt out and/or is removed by melting, and the second composition seals the ducts permanently.

The entire disclosures of all applications, patents and publications, cited above and below, and of corresponding application German P 42 38 120.7, filed Nov. 12, 1992, are hereby incorporated by reference.

What is claimed is:

1. A process for the production of a ceramic honeycomb monolith useful for cleaning exhaust systems of internal combustion engines, the process comprising the steps of:
    a) providing a monolith having numerous substantially parallel ducts with walls of a porous material selected from the group consisting of cordierite and sintered glass ceramic, the ducts terminating in first and second end faces of the monolith;
    b) selecting a first array of ducts opening at the first end face and masking said first array of ducts by introducing a first thermally removable sealing composition into said first array of ducts proximate the first end face;
    c) rotating the monolith 180° and masking a second array of ducts at the second end face by introducing the first thermally removable sealing composition into said second array of ducts, the second array of ducts corresponding substantially to ducts not selected in the first array of ducts;
    d) introducing into the ducts of the first array at the second end face of the monolith a second sealing composition which becomes hardened upon being sintered, the introduction step being accomplished by covering the entire second end face with the second sealing composition;
    e) introducing into the ducts of the second array at the first end face of the monolith the second sealing composition which becomes hardened upon being sintered, the introducing step being accomplished by covering the entire first end face of the monolith with the second sealing composition; and
    f) heating the monolith prepared in steps a) through e) to harden the second sealing composition while thermally removing the first sealing composition.

2. A process for sealing of ducts which extend all the way through a ceramic honeycomb monolith which is used for exhaust gas cleaning systems of internal combustion engines comprising the steps of:
    scanning a first end face (19) of the ceramic honeycomb monolith with an image recorder (10) to provide a scanned image, and storing the scanned image in a memory of a computer;
    searching the stored image with the computer for coherent zones (2,3,4,5) of ducts (6) corresponding with a desired geometry of a corresponding zone of an idealized honeycomb monolith such that the zones contain a maximally high number of ducts (6);
    determining a working scheme for computer activated metering heads (17, 18) of a metering device;
    lowering nozzles (22,23) of respective metering heads (17,18), in correspondence with the determined working scheme, into a portion of the ducts;
    introducing into end regions of said portion of the ducts, through said nozzles, a first, hardenable viscous sealing composition that can be burnt out and/or removed by melting wherein the metering heads are moved and actuated by motor means in such a way that, in correspondence with the aforementioned determination of zones of ducts (6), a head having a highest number of nozzles (22,23) is utilized with greatest frequency, and thereafter metering heads having a lower number of nozzles are used, until said portion of ducts (6) has been sealed;
    moving the nozzles out of said portion of the ducts;
    rotating the ceramic honeycomb monolith 180° to expose a second end face (20) of the ceramic honeycomb monolith;
    sealing ducts on the second end face in a pattern complementary to that of the first end face (19);
    hardening the first, hardenable viscous sealing composition in the end regions of the ducts;
    sealing still vacant duct openings with a second hardenable, viscous sealing composition which is different from the first sealing composition and which can be sintered to seal the ducts which do not have the first sealing composition therein; and
    heating and sintering the honeycomb monolith (1) during which the first sealing composition is burnt and/or melted out and the second sealing composition hardens in place.

3. Process according to claim 2, characterized in that, as the first composition, a predominantly organic mass at a viscosity "$\eta$" of $10^5$ dPa s to $10^6$ dPa s is introduced into the ducts.

4. Process according to claim 3 characterized by using, as the first sealing composition, an organic mass which can be burnt out and/or removed by melting at temperatures lower as compared with the second sealing a composition.

5. Process according to claim 4, characterized by using a thermoplastic mass as the first composition.

6. Process according to claim 5, wherein the first composition is selected from the group consisting of a waxy compound, a composition based on a hot melt adhesive, a composition based on silicone, and a composition based on synthetic resin.

7. Process according to claim 6, characterized by introducing, as the second sealing composition, a high-temperature-resistant, predominantly inorganic mass that can be sintered.

8. Process according to claims 7, characterized by introducing the second composition with a viscosity "$\eta$" of $10^4$ dPa s to $10^5$ dPa s.

9. Process according to claim 8, characterized in that the burning out and/or the removal by melting of the first composition takes place at temperatures considerably below the ceraming temperature of the ceramic honeycomb monolith and, respectively, of the second composition.

10. Process according to claim 9, characterized in that the burning out and/or the removal by melting of the first composition takes place during the rise of the temperature to a sintering temperature of the monolith and, respectively, of the second composition.

11. Process according to claim 2, characterized by using, as the first composition, an organic mass which can be burnt out and/or removed by melting at temperatures lower as compared with the second sealing composition.

12. Process according to claim 2, characterized by using a thermoplastic mass as the first composition.

13. Process according to claim 2, wherein the first composition is selected from the group consisting of a waxy compound, a composition based on a hot melt adhesive, a composition based on silicone, and a composition based on synthetic resin.

14. Process according to claim 2, characterized by introducing, as the second composition, a high-temperature-resistant, predominantly inorganic mass that can be sintered.

15. Process according to claims 2, characterized by introducing the second composition with a viscosity "$\eta$" pf $10^4$ dPa s to $10^5$ dPa s.

16. Process according to claim 2, characterized in that the burning out and/or the removal by melting of the first composition takes place at temperatures considerably below the sintering temperature of the monolith and, respectively, of the second composition.

17. Process according to claim 2, characterized in that the burning out and/or the removal by melting of the first composition takes place during the rise of the temperature to the sintering temperature of the monolith and, respectively, of the second composition.

* * * * *